Figure 1:
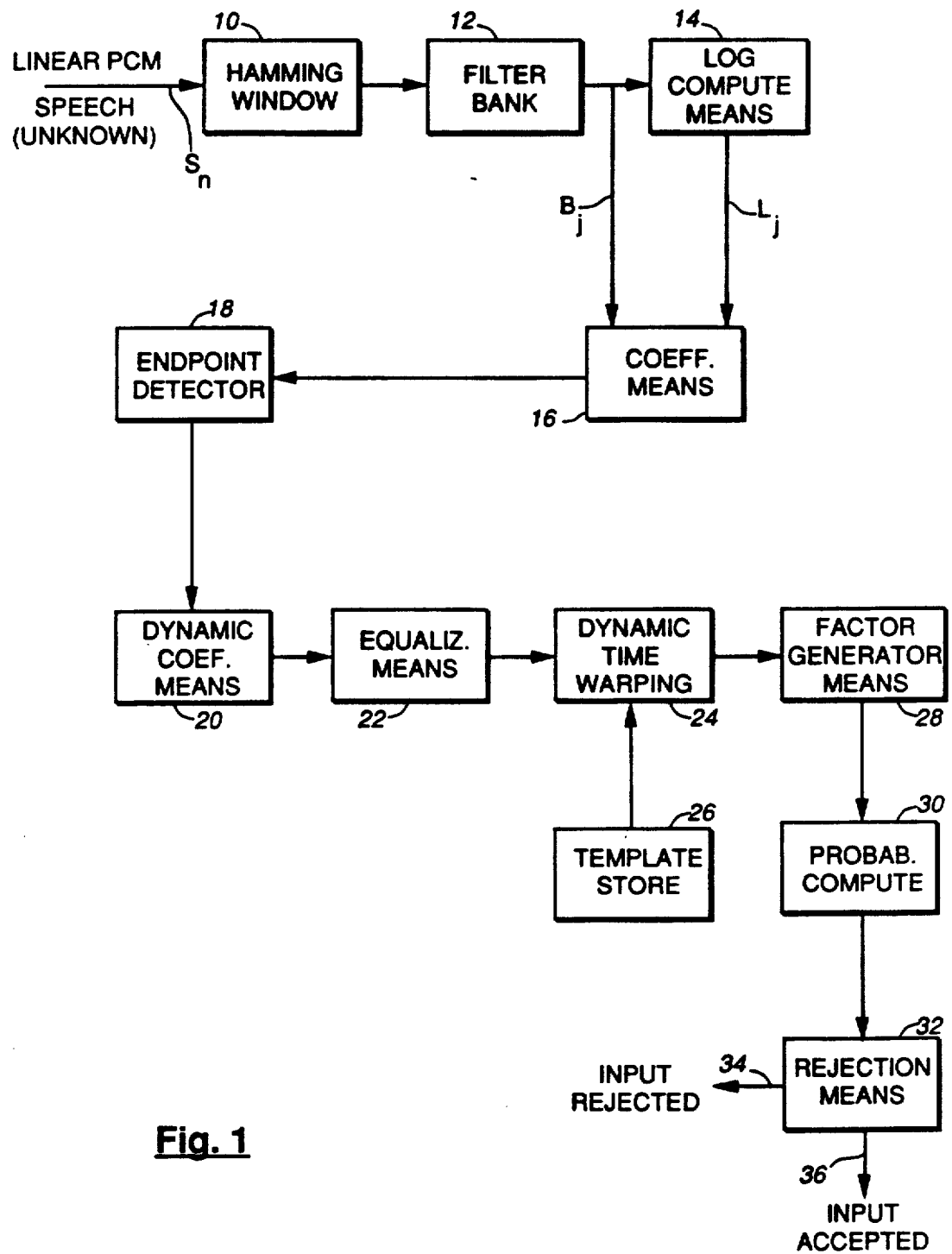

United States Patent [19]

Lennig

[11] Patent Number: 5,097,509
[45] Date of Patent: Mar. 17, 1992

[54] REJECTION METHOD FOR SPEECH RECOGNITION

[75] Inventor: Matthew Lennig, Montreal, Canada

[73] Assignee: Northern Telecom Limited, Montreal, Canada

[21] Appl. No.: 501,993

[22] Filed: Mar. 28, 1990

[51] Int. Cl.$^5$ .............................................. G10L 5/00
[52] U.S. Cl. ....................................... 381/43; 381/45
[58] Field of Search .................................. 381/42–45

[56] References Cited

U.S. PATENT DOCUMENTS 4,227,177 10/1980 Moshier ................................. 381/45
5,040,213 8/1991 Yasuda et al. ......................... 381/43

OTHER PUBLICATIONS

"Comparison of Parametric Representations for Monosyllabic Word Recognition in Continuously Spoken Sentences", by Steven B. Davis et al., IEEE Transactions on Acoustics, Speech, and Signal Processing, vol. ASSP-28, No. 4, Aug. 1980, pp. 357–366 Incl.

"An Improved Endpoint Detector for Isolated Word Recognition", by Lori F. Lamel et al., IEEE Transactions on Acoustics, Speech, and Signal Processing, vol. ASSP-29, No. 4, Aug. 1981, pp. 777–785 Incl.

"Use of Dynamic Programming in a Syllable-Based Continuous Speech Recognition System", by Melvyn J. Hunt et al., Time Warps, String Edits, and Macromolecules: The Theory and Practice of Sequence Comparison, pp. 163–187 Incl.

"Smoothing Sequences", from book entitled Exploratory Data Analysis by John W. Tukey, pp. 205–214 Inclusive.

Primary Examiner—Emanuel S. Kemeny
Attorney, Agent, or Firm—Dallas F. Smith

[57] ABSTRACT

A speech recognizer, for recognizing unknown utterances in isolated-word small-vocabulary speech has improved rejection of out of vocabulary utterances. Both a usual spectral representation including a dynamic component and an equalized representation are used to match unknown utterances to templates for in-vocabulary words. In a preferred embodiment, the representations are mel-based cepstral with dynamic components being signed vector differences between pairs of primary cepstra. The equalized representation being the signed difference of each cepstral coefficient less an average value of the coefficients. Factors are generated from the ordered lists of templates to determine the probability of the top choice being a correct acceptance, with different methods being applied when the usual and equalized representations yield a different match. For additional enhancement, the rejection method may use templates corresponding to non-vocabulary utterances or decoys. If the top choice corresponds to a decoy, the input is rejected.

19 Claims, 3 Drawing Sheets

REJECTION METHOD FOR SPEECH RECOGNITION

This invention relates to a rejection method for speech recognition and is particularly concerned with such speech recognition for user-independent and small vocabulary applications.

In known speech recognizers, the speech, coded in pulse code modulation (PCM) format, is pre-processed to render it in a form that is more closely related to the way in which the human auditory system perceives speech. For example, the speech may be processed to give filter bank energies, cepstra, mel-frequency cepstra, or linear prediction coefficients. Recognition units, for example, words or syllables, are then compared with each of a series of reference templates representing valid units. The template that is the closest match is accepted and the label of the accepted template is provided at the output.

Although such recognizers are adequate for certain applications, they are not entirely satisfactory because they give rise to an error rate that is unacceptable in some applications, especially speaker-independent, telephone based, or large vocabulary applications.

An object of the present invention is to provide an improved method and apparatus for speech recognition.

In accordance with another aspect of the present invention there is provided a method for speech recognition comprising the steps of: representing an unknown utterance as a first sequence of parameter frames, each parameter frame including a set of primary and secondary parameters and an equalized second sequence of parameter frames derived from the first sequence of parameter frames; comparing each of the primary and secondary parameters in the sequence of parameter frames of the representation of the unknown utterance to each of a plurality of reference representations expressed in the same kind of parameters, to determine how closely each reference representation resembles the representation of the unknown utterance; ranking the reference representations in order from best to worst choice in dependence upon their relative closeness to the representation of the unknown utterance, for each of the first and second sequences of parameters; computing a probability that the best choice is a correct match for the unknown utterance; and rejecting the best choice as a match for the unknown utterance if the probability is below a predetermined value.

In an embodiment of the present invention the step of representing includes the steps of dividing the unknown utterance into time frames, filtering the time frames to provide a plurality of channels spanning a predetermined range of frequencies, computing cepstral coefficients to provide the set of primary parameters, $C_1, \ldots, D_7$, detecting endpoints for the unknown utterance, computing a set of secondary parameters, $\Delta C_1, \ldots, \Delta C_7$, by determining signed differences between adjacent primary parameters, the sets of primary and secondary parameters forming the first sequence of parameter frames, and deriving the second sequence of parameters the first sequence of parameters by computing an average value of the first sequence of parameters and taking a signed difference of each of the parameters of the first sequence of parameters less the average value.

In accordance with another aspect of the present invention there is provided apparatus for speech recognition, comprising: means for representing an unknown utterance as a first sequence of parameter frames, each parameter frame including a set of primary and secondary parameters and an equalized second sequence of parameter frames derived from the first sequence of parameter frames; means for comparing each of the primary and secondary parameters in the sequence of parameter frames of the representation of the unknown utterance to each of a plurality of reference representations expressed in the same kind of parameters, to determine how closely each reference representation resembles the representation of the unknown utterance; means for ranking the reference representations in order from best to worst choice in dependence upon their relative closeness to the representation of the unknown utterance, for each of the first and second sequences of parameters; means for computing a probability that the best choice is a correct match for the unknown utterance; and means for rejecting the best choice as a match for the unknown utterance if the probability is below a predetermined value.

In an embodiment of the present invention the means for representing includes hamming window means for dividing the unknown utterance into time frames, filter bank means for filtering the time frames to provide a plurality of channels spanning a predetermined range of frequencies, coefficient generating means computing cepstral coefficients to provide the set of primary parameters, $C_1, \ldots, C_7$, endpoint detecting means for detecting endpoints for the unknown utterance, and dynamic coefficient means for computing a set of secondary parameters, $\Delta C_1, \ldots, \Delta C_7$, by determining signed differences between adjacent primary parameters, the sets of primary and secondary parameters forming the first sequence of parameter frames, and deriving the second sequence of parameters the first sequence of parameters by computing an average value of the first sequence of parameters and taking a signed difference of each of the parameters of the first sequence of parameters less the average value.

An advantage of the present invention is in computing a probability that the unknown and top choice reference template match, rather than merely selecting the label corresponding to the top choice reference template as a match for the unknown. This is necessary because an independent speaker does not always say what is expected.

Each parameter frame comprises a set of parameters selected according to the type of representation employed, for example filter bank energies, cepstra, mel-based cepstra or linear prediction coefficients.

Preferably, the time difference between centers of the different time frames is from 20 ms to 200 ms, preferably about 50 ms. Conveniently, the second parameter is derived from preceding and succeeding primary parameters, for example ±25 ms or ± two frames.

It is also preferable to include a component representing change in amplitude or change in perceptual loudness as a secondary parameter for both the unknown utterance and the reference templates. Such a loudness component is not usually used in the primary parameters since absolute amplitude or absolute loudness is not effective in distinguishing words.

Any kind of short-time spectral representation may be used as the set of primary parameters. Examples of such representations include filter bank energies, cepstra, mel-based cepstra or linear prediction coefficients. Each of these representations estimates the magnitude or power spectrum over a time frame (typically between 2 and 50 ms) in terms of a small number of parameters (typically between 3 and 80).

If $P_t$ is the vector of primary parameters computed at time t, time offsets a and b are chosen such that:

$$20 \text{ ms} \leq a + \leq 200 \text{ ms}$$

the dynamic parameter vector $\Delta P_t$ is defined to be the vector difference, $\Delta P_t = P_{t+a} - P_{t-b}$. The method uses the ensemble of parameters $P_t$ together with $\Delta P_t$ to represent the speech signal in the neighborhood of time t. Probability density functions and distances are then determined in terms of this augmented parameter set consisting of both static (primary) and dynamic (secondary) parameters.

Alternatively, the above derivation may be expressed in terms of frame numbers. If $\Delta t$ equals the time difference between adjacent frames and if $P_i$ equals the primary parameter vector at frame i, then the dynamic parameter vector $\Delta P_i$ is defined as the vector difference:

$\Delta P_i = P_{i+a'} - P_{i-b'}$ where a' equals the greatest integer not greater than $a/\Delta t$ and b' equals the greatest integer not greater than $b/\Delta t$.

Preferably, the parameters are mel-based cepstral coefficients in which case the primary coefficients $C_1, \ldots, C_n$ represent the spectral shape and the secondary parameters $\Delta C_1, \ldots, \Delta C_m$ represent change in spectral shape during the specified time interval. In addition $\Delta C_0$ may be included in the set of secondary parameters to represent change in loudness or amplitude.

Figure 2A:
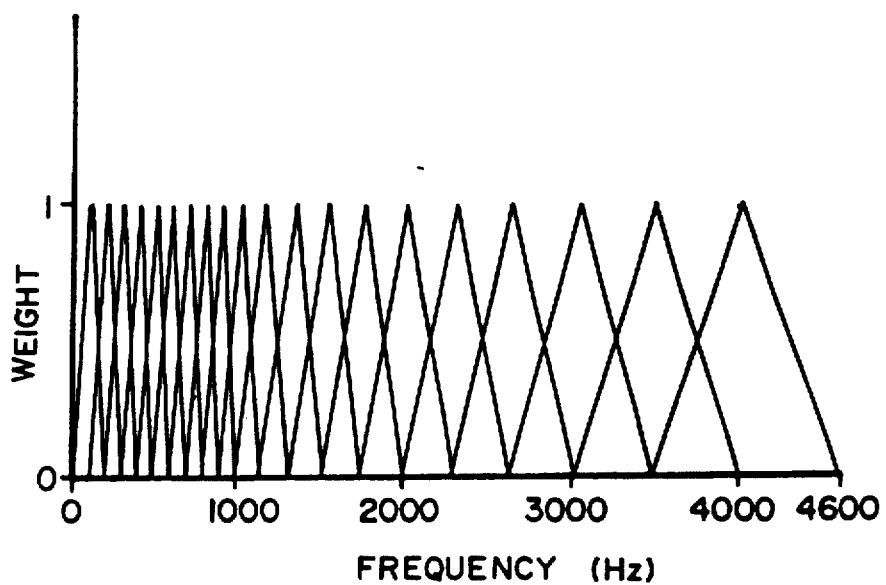
Figure 2B:
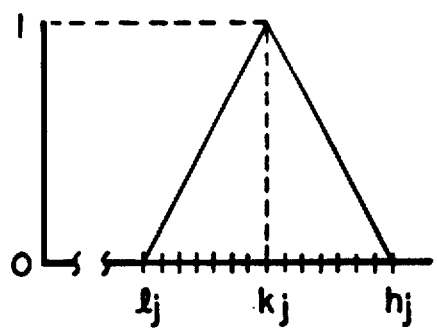
Figure 3:
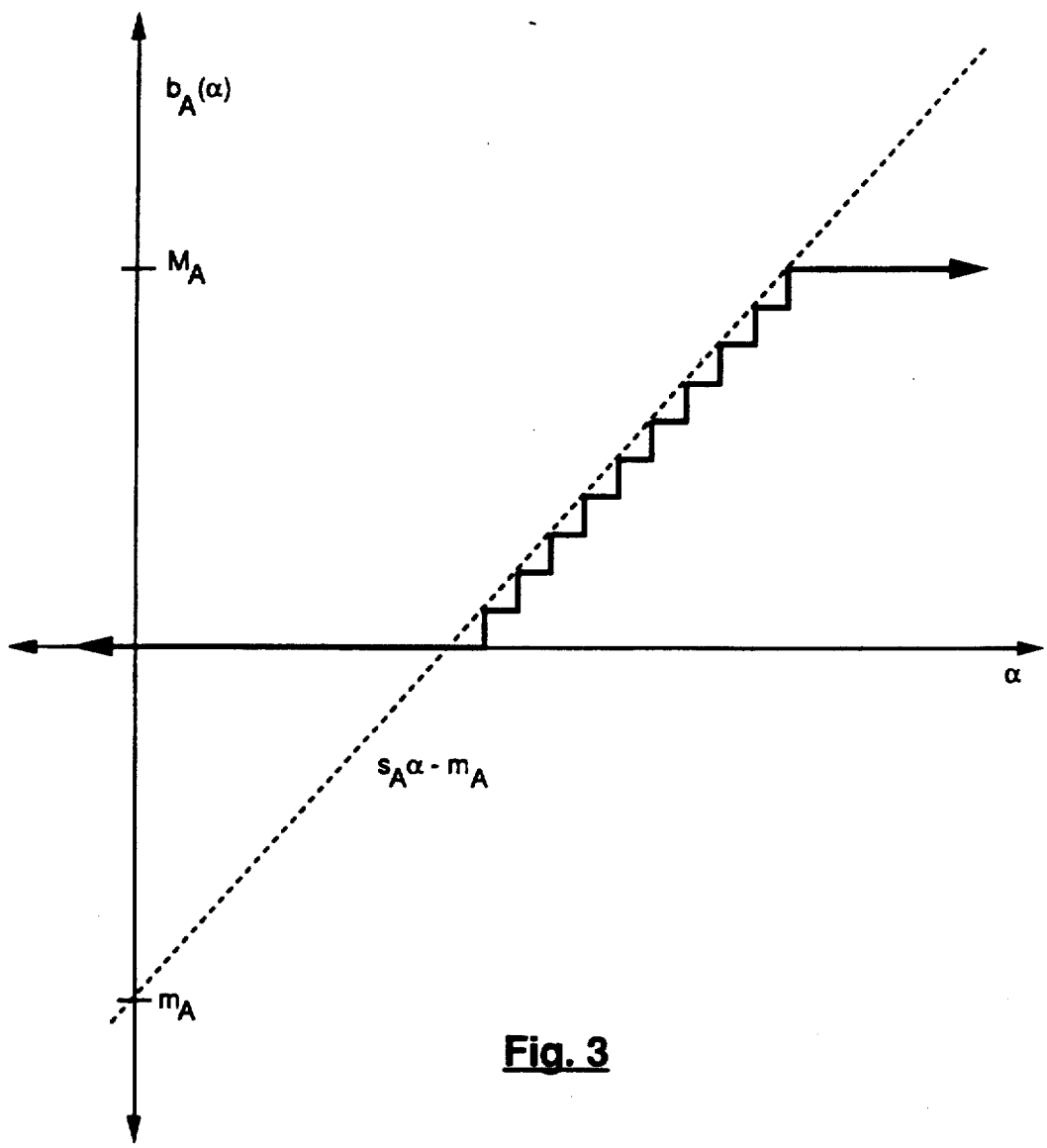

The present invention will be further understood from the following description with reference to the drawings in which:

FIG. 1 illustrates a generalized block diagram of a speech recognizer;

FIGS. 2a and 2b graphically illustrates representations of the characteristics of a filter means of the speech recognizer of FIG. 1; and FIG. 3 graphically illustrates an interval partitioning function $b_A(\alpha)$.

Referring to FIG. 1, there is illustrated a generalized block diagram of a speech recognizer. The speech recognizer includes a hamming window means 10 having an input for linear PCM speech followed by a filter bank 12. The output of the filter bank 12 is applied as an input to a log computation means 14 and a means for computing perceptual loudness and cepstral coefficients 16. The log computation means 14 output is also applied as an input to the means for computing perceptual loudness and cepstral coefficients 16. The means for computing perceptual loudness and cepstral coefficients 16 output is applied as an input to a means for detecting word endpoints 18. The means for detecting word endpoints 18 output is applied as an input to a means for computing dynamics 20. The means for computing dynamics 20 output is applied as an input to an equalization means 22 that provides an equalized set of coefficients. The equalization means 22 output is applied as an input to a means for dynamic time warping 24 which also receives input from a reference template store 26. The dynamic time warping means 24 output is applied as an input to a factor generator means 28 that provides factors based upon ordered distance lists provided as input. The factor generator means 28 output is applied as an input to a probability computation means 30. The probability computation means 30 output is applied as an input to a rejection means 32. The rejection means 32 has an "input rejected" output 34 and an "input accepted" output 36.

While the present embodiment uses dynamic time warping as a means of comparing the input to reference templates, other means are known, such as Hidden Markov Modelling (HMM). With HMM the references are represented by models and the nearness of the references to the unknown is expressed as a likelihood score.

In operation, an unknown utterance in the form of linear PCM coded speech signal $S_n$ is input to the hamming window means 10 where the signal $S_n$ is divided into time frames, each of 25.6 ms or 204 samples duration. Each frame is advanced by 12.75 ms or 102 samples so that successive frames overlap by 50 percent. Each time frame is then multiplied point-by-point by a raised cosine function and applied to the filter bank 12. The hamming window means 10 attenuates spectral sidelobes in the speech signal.

A 256 point fast Fourier transform is performed on each time frame and results in a 128 point real power spectrum, $F_1, \ldots, F_{128}$.

The filter bank 12 effectively comprises a filter bank of twenty triangular filters, which determine the energy in a corresponding set of twenty channels spanning a range from about 100 Hz to about 4000 Hz for a PCM sampling rate $f_s$ of 8 kHz. As illustrated in FIG. 2a, the channels are mel-spaced, with channel center frequencies spaced linearly from 100 Hz to 1000 Hz at 100 Hz intervals and logarithmically from 1100 Hz to 4000 Hz.

For each time frame, the output of each filter channel is weighted by $B_j$, derived in accordance with the expression:

$$B_j = \sum_{i=1}^{128} W_{ij} F_i$$

where $B_j$ is the jth mel-frequency channel energy output, $F_i$ are the 128 spectral magnitudes $1 \leq i \leq 128$ from the fast Fourier transform, and $W_{ij}$ are weights defined as:

$$W_{ij} = \begin{cases} 0, & i\Delta f \leq l_j \\ (i\Delta f - l_j)/(k_j - l_j), & l_j \leq i\Delta f \leq k_j \\ (h_j - i\Delta f)/(h_j - k_j), & k_j \leq i\Delta f \leq h_j \\ 0, & i\Delta f \geq h_j \end{cases}$$

for $1 \leq i \leq 128$ and $1 \leq j \leq 20$, where $\Delta f = f_s/256$ and where $l_j, k_j, h_j$ for $1 \leq j \leq 20$ are the low, center, and high frequencies, respectively of each filter channel, as illustrated in FIG. 2b, and given in Table 1.

The twenty log channel energies of the signal $B_j$ are computed in the log computation means 14 according to the expression: $L_j = \log_{10} B_j$ for $1 \leq j \leq 20$. The outputs of the filter bank 12 and the log computation means 14 are applied to the means for computing perceptual loudness and cepstral coefficients 16 for computing respectively, perceptual loudness $C_0$, and the first seven mel-based cepstral coefficients $C_1, C_2, \ldots, C_7$.

The perceptual loudness $C_0$ is the log of a perceptually weighted sum of the channel energies $B_j$ obtained thus:

$$C_0 = 600 \log_{10} \sum_{j=1}^{20} v_j B_j$$

where $v_j \geq 0$ are chosen to correspond to perceptual importance. Suitable values for $v_j$ are illustrated in Table 1.

TABLE 1

| FILTER NO. (j) | $l_j$ Hz | $k_j$ Hz | $h_j$ Hz | LOUDNESS WEIGHT $v_j$ |
|---|---|---|---|---|
| 1 | 0 | 100 | 200 | 0.0016 |
| 2 | 100 | 200 | 300 | 0.0256 |
| 3 | 200 | 300 | 400 | 0.1296 |
| 4 | 300 | 400 | 500 | 0.4096 |
| 5 | 400 | 500 | 600 | 1.0 |
| 6 | 500 | 600 | 700 | 1.0 |
| 7 | 600 | 700 | 800 | 1.0 |
| 8 | 700 | 800 | 900 | 1.0 |
| 9 | 800 | 900 | 1000 | 1.0 |
| 10 | 900 | 1000 | 1150 | 1.0 |
| 11 | 1000 | 1150 | 1320 | 1.0 |
| 12 | 1150 | 1320 | 1520 | 1.0 |
| 13 | 1320 | 1520 | 1750 | 1.0 |
| 14 | 1520 | 1750 | 2000 | 1.0 |
| 15 | 1750 | 2000 | 2300 | 1.0 |
| 16 | 2000 | 2300 | 2640 | 1.0 |
| 17 | 2300 | 2640 | 3040 | 1.0 |
| 18 | 2640 | 3040 | 3500 | 1.0 |
| 19 | 3040 | 3500 | 4000 | 1.0 |
| 20 | 3500 | 4000 | 4600 | 1.0 |

The means for computing perceptual loudness and cepstral coefficients 16 takes the cosine transform of the log energies in accordance with:

$$C_i = \sum_{j=1}^{20} L_j \cos[i(j - 1/2)\pi/20]$$

where $1 \leq i \leq 7$.

For further information on computing the coefficients, the reader is directed to a paper by S.B. Davis and P. Mermelstein entitled "Comparison of Parametric Representations for Monosyllabic Word Recognition in Continuously Spoken Sentences", IEEE Transactions on Acoustics, Speech, and Signal Processing, Vol. ASSP 28 No. 4, August 1980, pp. 357-366.

The output of means 16, which comprises the set of primary parameters $C_1, \ldots, C_7$ and the perceptually weighted loudness parameter $C_0$, is passed every 12.75 ms to the utterance endpoint detector 18. The word endpoints are detected by searching for minima of sufficient duration and depth in the perceptual loudness $C_0$ as a function of time frame number. Endpoint detection may be by one of various known methods, for example as disclosed in "An Improved Endpoint Detector for Isolated Word Recognition", L.F. Lamel, L.R. Rabiner, A.E. Rosenberg, and J. G. Wilpon, IEEE Transaction on Acoustics, Speech, and Signal Processing, Vol ASSP 29 No. 4, August 1981, pp. 777-785.

Thereafter the interword intervals or silences are removed, i.e. only the intervening utterance is transmitted. Optionally, the number of parameter frames per utterance M may be standardized, for example at $M = 32$, by linearly spaced frame deletion or repetition.

The output of the endpoint detector 18 is a sequence of M mel-based cepstra, and is represented by the matrix:

$$U_{stat} = \begin{matrix} C_{1,0} & \ldots & C_{1,7} \\ \vdots & & \vdots \\ C_{M,0} & \ldots & C_{M,7} \end{matrix}$$

This output signal or recognition unit representation, $U_{stat}$, is applied to the dynamic computing means 20 which computes the dynamic parameters as: $\Delta C_{i,j} = C_{i+c,j} - C_{i-d,j}$ for $d+1 \leq i \leq m-c$, $0 \leq j \leq 7$, where c is the leading frame separation, d is the lagging frame separation. In the specific case, $c = d = 2$.

For $1 \leq i \leq d+1$, $\Delta C_{i,j} = C_{i+c,j} - C_{i,j}$ and for $M - c \leq i \leq M$, $\Delta C_{i,j} = C_{M,j} - C_{i-d,j}$ These dynamic parameters take account of the human auditory system's propensity for perceiving change in the incoming stimulus.

The sequence of M parameter frames U comprising primary (static) and secondary (dynamic) parameters, represented by the matrix:

$$U = \begin{matrix} C_{1,0} & \ldots & C_{1,7} & \Delta C_{1,0} & \ldots & \Delta C_{1,7} \\ \vdots & & \vdots & \vdots & & \vdots \\ C_{M,0} & \ldots & C_{M,7} & \Delta C_{M,0} & \ldots & \Delta C_{M,7} \end{matrix}$$

is applied from the dynamic computing means 20 to the equalization means 22. In accordance with an embodiment of the present invention, the equalization means 22 provides a second sequence of M parameters $U_E$, represented by the matrix:

$$U_E = \begin{matrix} C_{E\,1,1} & \ldots & C_{E\,1,7} & \Delta C_{E\,1,0} & \ldots & \Delta C_{E\,1,7} \\ \vdots & & \vdots & \vdots & & \vdots \\ C_{E\,M,1} & \ldots & C_{E\,M,7} & \Delta C_{E\,M,0} & \ldots & \Delta C_{E\,M,7} \end{matrix}$$

which along with the regular parameters U, are applied to the dynamic time warping means 24.

It should be noted that the $C_0$ vectors relating to static loudness are not used.

A corresponding set of templates, including dynamic parameters and a dynamic loudness component $\Delta T_{i,0}$ is derived by template store means 26 of the form:

$$T = \begin{matrix} T_{1,1} & \ldots & T_{1,7} & \Delta T_{1,0} & \ldots & \Delta T_{1,7} \\ \vdots & & \vdots & \vdots & & \vdots \\ T_{M,1} & \ldots & T_{M,7} & \Delta T_{M,0} & \ldots & \Delta T_{M,7} \end{matrix}$$

-continued $$T_E = \begin{pmatrix} T_{E\,1,1} & \cdots & T_{E\,1,7} & T_{E\,1,0} & \cdots & T_{E\,1,7} \\ \vdots & & & & & \vdots \\ T_{E\,M,1} & \cdots & T_{E\,M,7} & T_{E\,M,0} & \cdots & T_{E\,M,7} \end{pmatrix}$$

The unknown parametric representations U and $U_E$ are each compared respectively to each member of the sets of nonequalized and equalized reference templates whose members are of the form T and $T_E$, respectively. The reference utterances are ranked in lists from best to worst match, for the regular U and equalized $U_E$ parameters, corresponding to minimum to maximum warp distance.

The dynamic time warp computation may be as described by Hunt, Lennig, and Mermelstein in a chapter entitled "Use of Dynamic Programming in a Syllable-Based Continuous Speech Recognition System" in *Time Warps, String Edits, and Macromolecules: The Theory and Practic of Sequence Comparison*, D. Sankoff and J.B. Kruskal, eds. Addison-Wesley (Reading, MA), pp. 163-187, 1983.

As discussed above, other means of comparing the input to references are known and may be used in place of dynamic time warping. Such means provide scores, which can be used to determine top choices for matching the unknown to the references.

Once the distances have been computed for both the regular or nonequalized parameters and the equalized parameters, two cases are possible. There can be an agreement between the nonequalized parameters and the equalized parameters as to the top choice, or a disagreement.

As an independent speaker does not always say what is expected, rather than merely selecting the label corresponding to the top choice reference template as a match for the unknown, a further step is taken. A probability that the unknown and top choice reference template match is computed. If the probability is below a threshold value, the match is rejected.

In the case of agreement, the top choice reference template label is the same for both the nonequalized and equalized lists. The probability that the unknown is a match is computed based on both lists. If the probability is below a threshold value, the match is rejected, otherwise it is accepted.

In the case of disagreement, the top choice from each of the nonequalized and equalized lists differs. The probability is computed for each of the top choices. The choice having the higher probability is selected. If the probability is below a threshold value, the match is rejected, otherwise it is accepted.

A further improvement in rejection can be made by providing utterance templates for nonvocabulary words or utterances that act as decoys. As a final step in the process, the top candidate is scanned to see if the match is such a decoy. If it is, the match is rejected.

Returning to the agreement case, a number of factors are derived from the nonequalized and equalized lists of distances for the nonequalized and equalized case, by a factor generator means 28, and subsequently used to compute the probability that the top choice correctly matches the unknown utterance, by a probability computation means 30. The first of these factors are the distances for the top choice utterance labels, $U_n$ and $U_e$, from the nonequalized and equalized lists, defined as $d_n$ and $d_e$, respectively. How close another label, U', different from the top choice, U, is to the top choice, is considered in computing the probability. One way to do this is by computing a ratio of the distance for the top choice to a distance for the closest other label. Let $d'_n$ be the closest distance for a label $U'_n$, which is different from the top choice $U_n$ in the nonequalized list. Then the ratio for the nonequalized list is defined as: $r_n = d_n/d'_n$. Similarly, $d'_e$ is the closest distance for a label $U'_e$, which is different from the top choice $U_e$ in the equalized list. Then the ratio for the equalized list is defined as: $r_e = d_e/d'_e$. Another way to characterize the closeness of the next closest label is to count the number of distances smaller than its distance. For label $U'_n$ this count is defined as $v_n$. Similary, for $U'_e$ the count is defined as $v_e$. The last factor used to calculate the probability is the length of the unknown utterance 1.

Table 2 provides a portion of a list for nonequalized and equalized distances as an example. Table 2 shows an agreement case, as the same word has received the smallest distance for both sets of parameters. From Table 2, the distances for the top choices, $U_n$ and $U_e$, for the nonequalized and equalized lists are $d_n = 10,000$ and $d_e = 7,000$, respectively. The distances for the next closest words, $U'_n$ and $U'_e$, for the nonequalized and equalized lists are $d'_n = 15,000$ and $d'_e = 9,000$, respectively. Thus the ratios for the nonequalized and equalized lists are $r_n = 10,000/15,000 = \frac{2}{3}$ and $r_e = 7,000/9,000 = 7/9$, respectively. The number of distances smaller than $d'_n$ is $v_n = 3$, and the number of scores better than $d'_e$ is $v_e = 2$.

TABLE 2

| NONEQUALIZED | | EQUALIZED | |
|---|---|---|---|
| Template Label | Score | Template Label | Score |
| word 1 | 10,000 | word 1 | 7,000 |
| word 1 | 11,000 | word 1 | 8,000 |
| word 1 | 14,000 | word 2 | 9,000 |
| word 2 | 15,000 | word 1 | 10,000 |
| word 2 | 17,000 | word 2 | 12,000 |
| word 2 | 18,000 | word 2 | 13,000 |

For the disagreement case, other factors need to be introduced. As the top choices of the nonequalized and equalized lists disagree, the other factors used are the smallest distance in one list corresponding to the top choice in the other and ratios based upon these distances. Specifically, the term $d''_n$ is defined as the smallest distance from the nonequalized list for the word corresponding to $U_e$. Similarly, the term $d''_e$ is defined as the smallest distance from the equalized list for the word corresponding to $U_n$. A ratio using the distance for the top choice and this smallest distance for each list is also computed. The ratios for the nonequalized and equalized lists are defined as: $r''_n = d''_n/d_n$ and $r''_e = d''_e/d_e$, respectively. Let $v''_n$ be defined as the negative number of distances in the nonequalized list which are smaller than the smallest distance in that list for $U_e$. Let $v''_e$ be defined as the negative number of distances in the equalized list which are smaller than the smallest distance in that list for $U_n$. The last factor used to calculate the probability is the length of the unknown utterance, 1.

Table 3 provides a portion of a list for nonequalized and equalized distances for a disagreement case. From Table 3, the distances for the top choices, $U_n$ and $U_e$, for the nonequalized and equalized lists are $d_n = 11,000$ and $d''_e = 8,000$, respectively. The distances for $U_e$ and $U_n$, from the nonequalized and equalized lists are $d''_n=15,000$ and $d''_e=9,000$, respectively. Thus the ratios from the nonequalized and equalized lists are $r''_n=15,000/11,000=15/11$ and $r''_e=9,000/8,000=9/8$, respectively. The negative number of scores better than $d''_n$ is $v''_n=-3$, and the negative number of scores better than $d''_e$ is $v''_e=-1$.

TABLE 3

| NONEQUALIZED | | EQUALIZED | |
|---|---|---|---|
| Utterance Label | Score | Utterance Label | Score |
| word 2 | 11,000 | word 1 | 8,000 |
| word 2 | 12,000 | word 2 | 9,000 |
| word 2 | 13,000 | word 2 | 10,000 |
| word 1 | 15,000 | word 2 | 11,000 |
| word 1 | 16,000 | word 1 | 13,000 |
| word 1 | 16,000 | word 1 | 14,000 |

Each factor provided by the factor generator means 28 contributes to the overall probability computed by the probability computation means 30 in a generalized form:

$$[P_A(\alpha)]^{W_A} \text{ where } (\alpha, A) \text{ belongs to the set}$$

$$\{(d_n,D_n), (d_e,D_e), (r_n,R_n), (r_e,R_e), (v_n,V_n), (v_e,V_e), (l,L)\}.$$

For the agreement case, the likelihood that the top choice is correct is computed in accordance with:

$$P_t = [P_{D_n}(d_n)]^{W_{D_n}} \cdot [P_{D_e}(d_e)]^{W_{D_e}} \cdot [P_{R_n}(r_n)]^{W_{R_n}} \cdot [P_{R_e}(r_e)]^{W_{R_e}}$$
$$\cdot [P_{V_n}(v_n)]^{W_{V_n}} \cdot [P_{V_e}(v_e)]^{W_{V_e}} \cdot [P_L(1)]^{W_L}$$

For the disagreement case, the likelihood that the top choice for the nonequalized list is correct is computed in accordance with:

$$P_n = [P_{D_n}(d_n)]^{W_{D_n}} \cdot [P_{D_e}(d''_e)]^{W_{D_e}} \cdot [P_{R_n}(r_n)]^{W_{R_n}} \cdot [P_{R_e}(r''_e)]^{W_{R_e}}$$
$$\cdot [P_{V_n}(v_n)]^{W_{V_n}} \cdot [P_{V_e}(v''_e)]^{W_{V_e}} \cdot [P_L(1)]^{W_L}$$

The likelihood that the top choice for the equalized list is correct is computed in accordance with:

$$P_e = [P_{D_n}(d''_n)]^{W_{D_n}} \cdot [P_{D_e}(d_e)]^{W_{D_e}} \cdot [P_{R_n}(r''_n)]^{W_{R_n}} \cdot [P_{R_e}(r_e)]^{W_{R_e}}$$
$$\cdot [P_{V_n}(v''_n)]^{W_{V_n}} \cdot [P_{V_e}(v_e)]^{W_{V_e}} \cdot [P_L(1)]^{W_L}$$

If $P_n > R_e$, then the top choice of the nonequalized list $U_n$ is taken as the overall top choice and its likelihood of being correct is taken as $P_t = P_n$. Conversely, if $P_e > P_n$, then the top choice of the equalized list $U_e$ is taken as the overall top choice and its likelihood of being correct is taken as $P_t = P_e$.

If the top choice is a decoy, the input is rejected by a rejection means 32. If its likelihood $P_t$ is less than a threshold value, the input is rejected by the rejection means 32. Typically, the threshold values are in the range from approximately 0.6 to approximately 0.9, with the higher numbers favouring less false acceptance at the expense of more false rejection.

Thus, from the nonequalized and equalized lists provided by the dynamic time warping means 24, seven factors are computed, by the factor generator means 28 that are then used, by the probability computation means 30, to compute the probability that the top choice is correct. In the agreement case, there is only one set of seven factors and one probability computation, as there is agreement between the nonequalized and equalized lists as to the top choice. However, for the disagreement case, there are two sets of seven factors and two probability computations. The higher probability indicates the better choice.

Generally, the computation of the probabilities is based on a ratio of correct acceptance to correct plus false acceptance for each factor value or band of factor values. The factor values are mapped into probability values using histograms of correct acceptance and false acceptance. The histograms are generated during a training session which uses a set of training data providing sufficient data over the expected range of all factors.

For each factor A belonging to the set $\{D_n, D_e, R_n, R_e, V_n, V_e, L\}$, the probability function $P_A$ is constructed as a piecewise constant function on the real numbers. The real numbers are divided into $K_A+1$ intervals, $\{0, \ldots, K_A\}$, in accordance with:

0 if the greatest integer less than $s_A\alpha - m_A < 0$;

$b_A(\alpha) = [M_A$ if the greatest integer less than $s_A\alpha - m_A > M_A$;

[the greatest integer less than $s_A\alpha - m_A$, otherwise.

The general function $b_A(\alpha)$ is graphically illustrated in FIG. 3. For the present embodiment, the values given in Table 4 are used for $s_A$, $m_A$, $M_A$, and $W_A$. The token length 1 is represented as the number of 12.75 ms frames.

TABLE 4

| A | $s_A$ | $m_A$ | $M_A$ | $W_A$ |
|---|---|---|---|---|
| $D_n$ | 0.01 | 50 | 350 | 1/12 |
| $D_e$ | 0.01 | 50 | 350 | 1/12 |
| $R_n$ | 1000 | 500 | 800 | 1/6 |
| $R_e$ | 1000 | 500 | 800 | 1/6 |
| $V_n$ | 1 | −4 | 9 | 1/6 |
| $V_e$ | 1 | −4 | 9 | 1/6 |
| L | 1 | 10 | 110 | 1/6 |

The training data are used to estimate the probability of correct acceptance as follows. For all of the factors A belonging to the set $\{D_n, D_e, R_n, R_e, V_n, V_e, L\}$, and for all $K_A+1$ intervals i, belonging to the set $\{0, \ldots, K_A\}$ as defined by $b_A(\alpha)$, two counters are defined: a correct acceptance counter $C_{A,i}$ and a false acceptance counter $F_{A,i}$. All of these counters are initialized to zero. Then using the set of training data a forced choice recognition experiment is run using both the nonequalized and equalized parameter sets. Each token in the training set has the following measurements associated with it: $d_n, d_e, r_n, r_e, v_n, v_e$, and 1. When the equalized and nonequalized lists yield the same top choice, there is agreement and either a correct acceptance or a false acceptance occurs. In the case of a disagreement, equalized and nonequalized lists each give either a correct acceptance or a false acceptance. For those tokens where disagreement occurs the following additional factors are available: $d''_n, d''_e, r''_n, r''_e, v''_n, v''_e$.

For each token in the training set, it is first determined whether there is agreement or disagreement, then the appropriate counters are incremented as follows. For the agreement case, for each $(A,\alpha)$ belonging to the set $\{(D_n,d_n), (D_e,d_e), (R_n,r_n), (R_e,r_e), (V_n,v_n), (V_e,v_e), (L,1)\}$, if the top choice is a correct acceptance, counter $C_{A,b_A(\alpha)}$ is incremented, and if the top choice is a false acceptance the counter $F_{A,b_A(\alpha)}$ is incremented. For the disagreement case, for each $(A,\alpha)$ belonging to the set $\{(D_n,d_n), (D_e,d''_e), (R_n,r_n), (R_e,r''_e), (V_n,v_n), (V_e,v''_e), (L,1)\}$, if the nonequalized top choice is a correct acceptance, counter $C_{A,b_A(a)}$ is incremented, and if the nonequalized top choice is a false acceptance the counter $F_{A,b_A(a)}$ is incremented. In addition, for each $(A,a)$ belonging to the set $\{(D_n,d''_n), (D_e,d_e), (R_n,r''_n), (R_e,r_e), (V_n,v''_n), (V_e,v_e), (L,1)\}$, if the equalized top choice is a correct acceptance, counter $C_{A,b_A(a)}$ is incremented, and if the equalized top choice is a false acceptance the counter $F_{A,b_A(a)}$ is incremented. Note that the factors used in each of the nonequalized and equalized cases differ with the exception of length, l.

By accumulating data for all of the tokens of the data set, a set of histograms is produced, one for each of the factors, A. For each interval i, belonging to the set $\{0, \ldots, K_A\}$, the histogram has a correct acceptance count and a false acceptance count. The histograms are stored in the probability computation means 30 and subsequently used to determine the probability $P_A$ for each of the factors A for the unknown input utterance.

For the present embodiment, a range of $\pm 2$ intervals, minimum, that provide a minimum total count $F_A + C_A$ of 23 was found to work well in computing the probabilities for A belonging to the set $\{D_n, D_e, R_n, R_e, L\}$. In the present embodiment, the probability $P_A$ is defined in accordance with:

$$P_A(a) = \text{thrice smoothed } \pi_A[b_A(a)]$$

$$\text{where } \pi_A(i) = \sum_{j=i-2}^{i+2} C_{A,j} / \sum_{j=i-2}^{i+2} (C_{A,j} + F_{A,j})$$

The smoothing uses medians of three smoothing defined in J. W. Tukey, *Exploratory Data Analysis*, 1977, Addison-Wesley. Medians of three smoothing takes the median value of three values. Using the smoothing function compensates for sharp variations in the probability caused by low counts for particular intervals.

While the above definition of $\pi_A$ uses $\pm 2$ as the interval range, in general the interval range can be defined as $g_{A,i}$, the smallest integer larger than $\beta$ such that:

$$\sum_{j=i-g_{A,i}}^{i+g_{A,i}} (C_{A,j} + F_{A,j}) \geq \phi$$

where $\phi$ and $\beta$ are non negative integers

In the general case $\pi_A(i)$ is defined as:

$$\pi_A(i) = \sum_{j=i-g_{A,i}}^{i+g_{A,i}} C_{A,j} / \sum_{j=i-g_{A,i}}^{i+g_{A,i}} (C_{A,j} + F_{A,j})$$

The probabilities for A belonging to the set $\{V_n, V_e\}$ are defined in accordance with:

$$P_A(a) = C_{A,b_A(a)} / (C_{A,b_A(a)} + F_{A,b_A(a)})$$

Once the probability has been computed and the top choice has been chosen, if the top choice corresponds to a decoy, the rejection means 32 rejects the input as indicated by 34. If the probability of the top choice falls below the threshold value, the choice is rejected, again as indicated by 34. Otherwise, the input is accepted as indicated by 36.

Although described as applied to isolated word recognizers, the invention is also applicable to connected word recognizers and is also useful whether the recognizer is speaker-trained or speaker-independent.

Experimental results using the rejection techniques as described above, in a speaker-independent Yes, No vocabulary recognition over a public switched telephone network show a false acceptance rate of less than approximately one percent and a false rejection rate of less than approximately five percent.

Numerous modifications, variations and adaptations may be made to the particular embodiments of the invention described above without departing from the scope of the invention, which is defined in the claims.

What is claimed is:

1. A method for speech recognition comprising the steps of:
   representing an unknown utterance as a first sequence of parameter frames, each parameter frame including a set of primary and secondary parameters and an equalized second sequence of parameter frames derived from the first sequence of parameter frames;
   comparing each of the primary and secondary parameters in the sequence of parameter frames of the representation of the unknown utterance to each of a plurality of reference representations expressed in the same kind of parameters, to determine how closely each reference representation resembles the representation of the unknown utterance;
   ranking the reference representations in order from best to worst choice in dependence upon their relative closeness to the representation of the unknown utterance, for each of the first and second sequences of parameters;
   computing a probability that the best choice is a correct match for the unknown utterance; and
   rejecting the best choice as a match for the unknown utterance if the probability is below a predetermined value.

2. A method as claimed in claim 1 wherein the second sequence of parameters is derived from the first sequence of parameters by the steps of computing an average value of the first sequence of parameters and taking a signed difference of each of the parameters of the first sequence of parameters less the average value.

3. A method as claimed in claim 1 wherein the step of computing a probability includes the step of comparing the top choice for the first sequence of parameters to the top choice for the second sequence of parameters to determine whether there is agreement as to the top choice.

4. A method as claimed in claim 3 wherein the step of comparing determines that there is agreement and wherein the step of computing a probability includes the steps of generating a set of factors based upon the ranking of the reference representations for the first and second sequences of parameters and using the set of factors to calculate the probability that the top choice is a correct match.

5. A method as claimed in claim 3 wherein the step of comparing determines that there is disagreement and wherein the step of computing a probability includes the steps of generating two sets of factors based upon the ranking of the reference representations for the first and second sequences of parameters and using the two sets of factors to calculate respective probabilities that the top choice for each of the first and second sequence of parameters is a correct match.

6. A method as claimed in claim 1 further comprising the steps of providing nonvocabulary reference representations among the reference representations and rejecting the top choice if it is a nonvocabulary reference representation.

7. A method as claimed in claim 1 wherein the step of representing includes the steps of dividing the unknown utterance into time frames, filtering the time frames to provide a plurality of channels spanning a predetermined range of frequencies, computing cepstral coefficients to provide the set of primary parameters, $C_1, \ldots, C_7$, detecting endpoints for the unknown utterance, computing a set of secondary parameters, $\Delta C_1, \ldots, \Delta C_7$, by determining signed differences between adjacent primary parameters, the sets of primary and secondary parameters forming the first sequence of parameter frames, and deriving the second sequence of parameters the first sequence of parameters by computing an average value of the first sequence of parameters and taking a signed difference of each of the parameters of the first sequence of parameters less the average value.

8. A method as claimed in claim 1 wherein the step of comparing includes the step of computing dynamic time warping distances for reference representations for both first and second sequences of parameters frames.

9. A method as claimed in claim 8 wherein the best choice has the smallest relative dynamic time warping distance.

10. Apparatus for speech recognition, comprising:
means for representing an unknown utterance as a first sequence of parameter frames, each parameter frame including a set of primary and secondary parameters and an equalized second sequence of parameter frames derived from the first sequence of parameter frames;
means for comparing each of the primary and secondary parameters in the sequence of parameter frames of the representation of the unknown utterance to each of a plurality of reference representations expressed in the same kind of parameters, to determine how closely each reference representation resembles the representation of the unknown utterance;
means for ranking the reference representations in order from best to worst choice in dependence upon their relative closeness to the representation of the unknown utterance, for each of the first and second sequences of parameters;
means for computing a probability that the best choice is a correct match for the unknown utterance; and
means for rejecting the best choice as a match for the unknown utterance if the probability is below a predetermined value.

11. Apparatus as claimed in claim 10 wherein the means for representing includes hamming window means for dividing the unknown utterance into time frames, filter bank means for filtering the time frames to provide a plurality of channels spanning a predetermined range of frequencies, coefficient generating means computing cepstral coefficients to provide the set of primary parameters, $C_1, \ldots, C_7$, endpoint detecting means for detecting endpoints for the unknown utterance, and dynamic coefficient means for computing a set of secondary parameters, $\Delta C_1, \ldots, \Delta C_7$, by determining signed differences between adjacent primary parameters, the sets of primary and secondary parameters forming the first sequence of parameter frames, and deriving the second sequence of parameters the first sequence of parameters by computing an average value of the first sequence of parameters and taking a signed difference of each of the parameters of the first sequence of parameters less the average value.

12. Apparatus as claimed in claim 10 wherein the means for comparing includes means for computing dynamic time warping distances for reference representation for both first and second sequences of parameter frames.

13. Apparatus as claimed in claim 10 wherein the means for computing a probability includes factor generator means and probability computation means.

14. Apparatus as claimed in claim 13 wherein in a case of agreement between the top choice for the first sequence of parameters to the top choice for the second sequence of parameters, the factors used to compute the probability that the top choice is correct are of the set $\{d_n, d_e, r_n, r_e, v_n, v_e, 1\}$.

15. Apparatus as claimed in claim 14 wherein the probability is computed in accordance with:

$$P_t = \left[P_{D_n(d_n)}\right]^{W_{D_n}} \cdot \left[P_{D_e(d_e)}\right]^{W_{D_e}} \cdot \left[P_{R_n(r_n)}\right]^{W_{R_n}} \cdot \left[P_{R_e(r_e)}\right]^{W_{R_e}} \cdot \left[P_{V_n(v_n)}\right]^{W_{V_n}} \cdot \left[P_{V_e(v_e)}\right]^{W_{V_e}} \cdot \left[P_{L(1)}\right]^{W_L}$$

16. Apparatus as claimed in claim 13 wherein in a case of disagreement between the top choice for the first sequence of parameters to the top choice for the second sequence of parameters, the factors used to compute the probability that the top choice for the first sequence of parameters is correct are of the set $\{d_n, d''_e, r_n, r''_e, v_n, v''_e, 1\}$.

17. Apparatus as claimed in claim 16 wherein the probability is computed in accordance with:

$$P_n = \left[P_{D_n(d_n)}\right]^{W_{D_n}} \cdot \left[P_{D_e(d''_e)}\right]^{W_{D_e}} \cdot \left[P_{R_n(r_n)}\right]^{W_{R_n}} \cdot \left[P_{R_e(r''_e)}\right]^{W_{R_e}} \cdot \left[P_{V_n(v_n)}\right]^{W_{V_n}} \cdot \left[P_{V_e(v''_e)}\right]^{W_{V_e}} \cdot \left[P_{L(1)}\right]^{W_L}$$

18. Apparatus as claimed in claim 13 wherein in a case of disagreement between the top choice for the first sequence of parameters to the top choice for the second sequence of parameters, the factors used to compute the probability that the top choice for the second sequence of parameters is correct are of the set $\{d''_n, d_e, r''_n, r_e, v''_n, v_e, 1\}$.

19. Apparatus as claimed in claim 18 wherein the probability is computed in accordance with:

$$P_e = \left[P_{D_n(d''_n)}\right]^{W_{D_n}} \cdot \left[P_{D_e(d_e)}\right]^{W_{D_e}} \cdot \left[P_{R_n(r''_n)}\right]^{W_{R_n}} \cdot \left[P_{R_e(r_e)}\right]^{W_{R_e}} \cdot \left[P_{V_n(v''_n)}\right]^{W_{V_n}} \cdot \left[P_{V_e(v_e)}\right]^{W_{V_e}} \cdot \left[P_{L(1)}\right]^{W_L}$$

* * * * *